May 15, 1956 — K. KARCH — 2,745,768
EROSION AND FLOOD CONTROL AND LAND RECLAMATION
Filed April 15, 1952 — 2 Sheets-Sheet 2

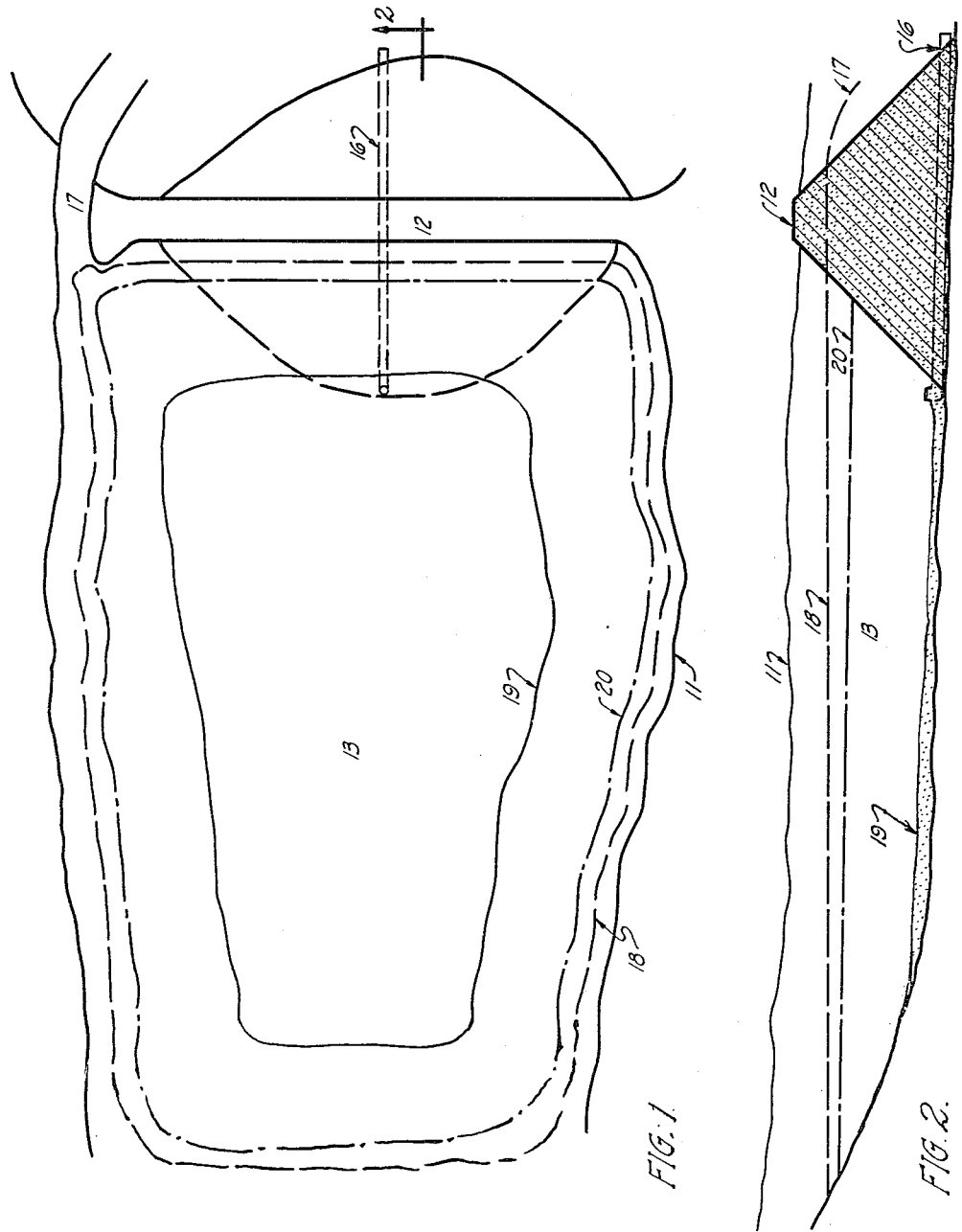

KREKEL KARCH INVENTOR.
BY Glenn W. Parsons
AGENT

2,745,768
Patented May 15, 1956

2,745,768
EROSION AND FLOOD CONTROL AND LAND RECLAMATION

Krekel Karch, Decatur, Ill.

Application April 15, 1952, Serial No. 282,317

1 Claim. (Cl. 61—1)

This invention relates to water control, and especially to erosion and flood prevention and control and the reclamation of land damaged by failure to protect it with proper water control measures.

This failure results in the terrain surface becoming cut, by repeated passage of run-off water, with sloping depressions called "cuts," "ditches" and "gullies," ranging in magnitude from initial surface breaks to small valleys. These depressions will hereinafter be referred to as "gullies." This erosion is caused in part by such unwise practices as deforestation and cultivation of excessively sloping terrain.

Erosion has many unfortunate consequences, among which are: (a) loss of almost irreplaceable top-soil; (b) loss of fertilizer; (c) rendering the land so rough it is unusable and nearly worthless; (d) the ground water table level drops, due to the rapid run-off of water which would formerly have been held long enough by vegetation to soak into the ground to a large extent; (e) the soil carried away in streams renders them unfit for fish and other aquatic life and for recreational and industrial uses; (f) the soil is deposited in rivers where it is a hazard to navigation and in lakes where it seriously reduces the storage capacity of the basin; and (g) the rapid run-off of water is a major cause of disastrous floods.

The prior art discloses numerous methods which have been evolved in very extensive, elaborate and expensive efforts to prevent and control erosion and floods, and to reclaim damaged land. As is well known, erosion and flood control are so closely related as to almost amount to one indivisible problem. The scope of operations of the United States Soil Conservation Service is adequate testimony of the national importance of this problem. Nevertheless, the ratio of experimental work performed to the importance of the problem is very low, and one reason for this has been the heretofore costly nature of the work, since very large equipment is required in earth and hydraulic engineering construction.

Among the well-known methods of trying to prevent and control erosion are contour farming and terracing, these being rather widely practiced on rolling or hilly farmland. Actually, although these methods have been helpful in many instances, they possess serious disadvantages which limit their usefulness. Furthermore, they should be classed as temporary preventive measures, rather than efforts at permanent reclamation.

One serious shortcoming of the contour farming method of erosion control is the burden placed upon the farmer in establishing and maintaining his contour lines, and the difficulty inherent in operating his equipment in such a prescribed and careful manner. Furthermore, the strips of grass normally placed at intervals cut down on the area of land that can be cultivated. In some cases, these grass areas are farmed in alternate years. The frequency of occurrence of these grassy strips in contour farming depends upon the nature of the terrain, such as the degree of slope and the type of soil.

Where terracing is used as a means of controlling erosion, the space reserved for the terraces often constitutes a large proportion of the ground which is being farmed. These terraces are expensive to prepare and maintain, tending to constantly break through in certain spots and leading to incipient erosion areas. Terracing also normally requires the use of grass waterways, which again result in making some of the land unavailable for cultivation. Thus, the terraces are prepared in such a way that the water is diverted toward one end of the terraces, where it enters a grass waterway. These waterways may then lead to a drainage ditch.

In drainage ditches along highways and railways, engineers frequently make use of weir notches in an effort to prevent erosion. In effect, a "stairstep" arrangement results, the distance between weirs depending upon the slope of the ditch. These weirs generally soon become undercut on the downhill side and frequently become dislodged by the pressure of the water rushing over them. At best, they are ordinarily only a temporary measure of erosion control, and consequently make only a slight contribution to the overall problem of erosion and flood control.

There are of course numerous other methods of erosion control, such as planting grasses and shrubs or trees. Also, efforts of various magnitude are made to create dams or obstructions in ditches and gullies, such as by throwing brush, trees or other objects into the gully, to try to stop further erosion. The ineffectiveness of most of these methods is generally appreciated, and can be readily observed in traveling around the country.

Water control problems are more commonly associated with zones of substantial rainfall, but areas affected by melting snows also have similar problems, and my invention is applicable regardless of the source of the water.

It is a principal object of the present invention to provide methods and means for preventing and controlling erosion and floods, and reclaiming land which has been damaged by erosion.

Another object of this invention is to provide methods and means for preventing and controlling erosion and floods and reclaiming damaged land which are practical, economically feasible and within the reach of all landowners and others concerned with these problems.

Another object of this invention is to provide methods and means for preventing and controlling erosion which will substantially eliminate the disastrous floods which repeatedly lay waste to large areas of the land.

Another object of this invention is to provide feasible and effective methods and means for raising the ground water table level, and preventing loss of fertilizers from the soil.

These and other objects have been fully realized by my invention, which will hereafter be fully set forth and explained, with examples showing how the invention has accomplished the objects above set forth.

Briefly stated, my methods comprise the principles of slowing the velocity of silt-laden water to such a degree, and for such a length of time, that a large proportion of the silt is deposited and a substantial proportion of the water soaks into the terrain, after which the desilted, remaining water passes on along its course.

Specific means for applying the principles of my invention will now be set forth and explained in conjunction with the attached drawings, which are illustrative only, and are not to be considered as determinative of the scope of my invention.

Figure 1 is a plan view detail of the dry basin.

Figure 2 is an elevation view of the material set forth in Figure 1, taken on the section line 2—2 of Figure 1.

Figure 3:
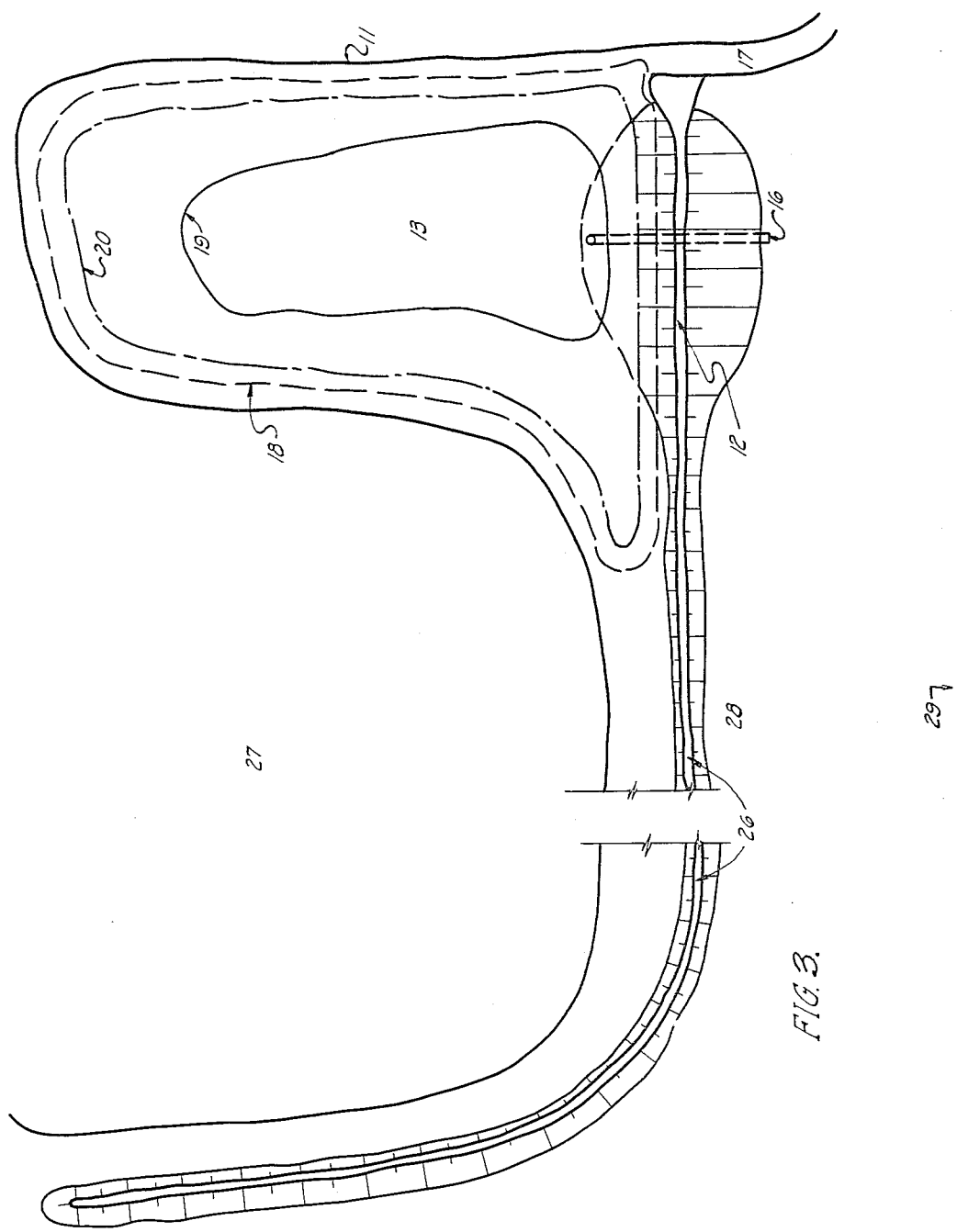
Figure 3 is a diagrammatic plan view of an installation combining a conventional terrace with my dry basin means.

Referring now to the drawings, particularly Figures 1 and 2, the numeral 11 represents the original ground line which forms the top of a gully. Across this gully is constructed one or more barriers 12, which may suitably be of about the same elevation as the ground line 11. This type of barrier, shown more in detail in Figures 1 and 2, forms the dry basin 13.

Referring now to Figures 1 and 2, the barrier 12 may be constructed of various materials, such as earth, rock, concrete, timbers and metal, or combinations of these materials. In general, earth is the preferred form of construction, because of its general availability, cheapness and adaptability for subsequent use as pasturage or even cultivated land. These subsequent uses are readily realized by providing gradual slopes on the barrier.

Prior to or in the preliminary stages of constructing this barrier 12, a conduit 16 is placed approximately in what will be the center of the barrier structure, as shown in the drawings. This conduit 16 may desirably have a slight fall throughout its length, so that water will not stand in it. It may discharge into another dry basin or into a stream or lake or otherwise, as will be discussed hereinafter. The inlet end of conduit 16 is positioned at approximately the lowest level of the gully, which ordinarily is somewhere near the center. The inlet end is turned upwardly as, for example, by the use of an elbow, for reasons which will be discussed later. The conduit 16 may be made of any suitable material, such as metal, concrete, tile, plastic or wood.

It is desirable to provide in conjunction with the barrier structure 12 a spillway 17, which may conveniently be merely a depression in the terrain, although it of course may be constructed of a material such as concrete. Where the spillway is constructed of earth, it is desirable to plant it with grass or other protective vegetative covering. These spillways are entirely satisfactory under most conditions, since they withstand the occasional and usual brief passage of water quite well, without any erosion. Obviously, the cost of installation is quite low, and little or no maintenance is required.

The operation of my erosion control means, and the principles of my methods, will be better understood by considering the operation of the structure and the dry basin formed by it.

In times of rainfall, water will flow rapidly down the gully, the velocity depending upon such factors as the amount of rainfall and the slope of the gully, carrying in suspension with it soil or silt washed from the land drained by the gully. When the silt-laden water reaches the barrier 12, its movement is of course interrupted, and there is a tendency for the suspended silt to be deposited at that time. As additional water enters the basin formed by the barrier, encountering the water already present, its velocity is decreased to a value where there is a tendency for its silt to be deposited on the floor of the gully, largely at that point on the periphery of the water present in the basin where the silt-laden water enters, thus resulting in substantially successive increments of silt at the ever-changing water periphery. When the water rises to the level of the inlet end of the conduit 16, water of course passes through the conduit.

This conduit is so designed that the rate of flow through it is substantially less than the normal rate of flow of water into the basin. This design of the conduit is based upon such considerations as the water-shed area, type of terrain, inches of rainfall and the capacity of the basin formed by the barrier. In any event, the water level ordinarily rises above the level of the conduit inlet and, in the case of an exceptionally heavy rainfall, may even reach the overflow level 18 and pass through the spillway 17. But in accordance with the principles of my invention, the water velocity has been sufficiently reduced so that the silt is deposited on the floor of the basin 13 formed by the barrier 12.

The water temporarily trapped in the dry basin 13 gradually passes out through the conduit 16, and the water level drops to the level of the conduit inlet. The time required for this cycle for a given fall of rain depends upon such factors as the amount of water trapped in the basin and the size of the conduit opening. Where land under cultivation is affected, the dry basin structure is preferably designed to empty in a period of about one-half to two days, which of course is not long enough to damage the crops, but is effective in promoting silt deposition, permitting substantial penetration of water into the subsoil and preventing the development of floods.

In the meantime, and thereafter with respect to the water remaining, considerable water is of course penetrating the subsoil beneath the basin, the rate depending in part upon the nature of the subsoil, and thus not only contributing to the raising of the ground water table level, but considerably reducing the volume to be discharged below the barrier, a very important factor in preventing development of floods. Therefore, the basin soon dries out, and will remain dry until the next rainfall. Since the basin is normally dry, except in times of rainfall, it is accordingly referred to herein as a "dry basin."

There may be situations arise where it is desirable, as in times of drought, to operate the dry basin in a manner calculated to capture and retain as much water as is possible. Under these circumstances, the conduit 16 may be modified by the addition of a valve, as for example a float actuated valve which opens when the water level rises to a predetermined height, or any other kind of a valve, of any conventional type, capable of restricting or stopping the flow of water at any desired time. For example, the valve could be closed so that the dry basin would hold the entire run-off water following a light rainfall. Also, in the case of a heavy rainfall, where the water level in the basin had risen to a point where the water was passing through the spillway, the valve could be closed as soon as the water had stopped passing through the spillway, in which case the basin would serve as a temporary storage basin. This water might be desired for immediate use in irrigation or some other special purpose, or merely held for the purpose of raising the ground water table level.

During the initial usage of the dry basin 13, the silt first fills the irregularities on the floor of the basin, and thereafter the floor of the basin continues to build up from repeated depositions of silt. As this process continues, the inlet end of the conduit 16 is occasionally raised, as by the addition of extensions, such as sections of tile or pipe, so that the inlet level is normally appreciably above the silt level 19.

This is one reason why it is preferred to have the conduit turned upwardly at its inlet end, as by the use of an elbow. While it is not absolutely necessary, it is also desirable to have the inlet pipe substantially perpendicular, since this facilitates the ready addition of extensions of the tile type, and minimizes possible clogging of the conduit from the entry of objects floating on the surface of the water. To further protect the inlet opening, a grillwork or other type of guard may be placed over or around the inlet. A suitable filter device may also be utilized on the conduit inlet.

In the operation of the dry basin 13, it is intended that the basin fill with water to a level substantially above the inlet end of the conduit 16. Some adjustment of the size of the inlet opening may be necessary to insure this action. Thus, if the conduit has been made too large, any simple, conventional arrangement can be made to reduce the area of the inlet opening, so that normal rainfalls will result in the formation of a temporary lake in the dry basin.

This temporary lake storage capacity, as indicated in the drawings, is that water volume between the silt level 19 and the overflow level 18. As the silt level 19 rises, over a period of time, this temporary storage capacity is gradually reduced. However, even when the silt level has risen to its ultimate practical limit 20, there is still a substantial storage capacity between levels 20 and 18, due to the relatively large area at that elevation, and the basin continues to function as a flood prevention and control means.

The ultimate silt level 20 is reached, as a practical matter, when the slope around the periphery of the dry basin 13 is such that erosion no longer occurs. At that time, an undisturbed dry basin will be quite flat in comparison with surrounding terrain, and will ordinarily have long since developed a grass or other vegetative covering. Alternatively, at this stage, or even before this time, the dry basin may be used for cultivation, since the slope of the basin walls will have been reduced to a point where cultivation is practical.

The rate of attainment of the ultimate silt level 20 obviously depends upon many factors, not the least of which is the proportion of the soil or silt in the water flowing into the basin. If the silt content is high, as in some areas of the West, the dry basin may silt in and heal relatively soon. Contrariwise, if the silt content is low, the basin may take many times as long to fill with silt to the ultimate silt level 20.

In the manner described above, the dry basin 13 functions as a temporary storage capacity for silt-laden water. One obvious advantage of this function is that the dry basin serves as a temporary storage for water which would otherwise rush onward and contribute to the development of flood conditions in the lowlands. Another obvious advantage is that the temporary storage of this water permits seepage downward into the subsoil, with the result that the water table level in the ground tends to rise in the vicinity of these dry basins. Still another advantage is that the silt-laden water velocity is sufficiently reduced to allow deposition of the silt.

*Example 1*

A tract of land sloping toward a small creek was cut by a large gully about eight feet deep and twenty feet wide at its junction with the creek. A dry basin of the types shown in Figures 3 and 4 was constructed in this gully about 100 feet from the creek, and the experimental installation periodically inspected during several years, to check on the effectiveness of this trial of my invention.

The dry basin filled with water, and occasionally overflowed, in times of rainfall, but the gully floor gradually filled in with silt and on recent inspection the floor was found to have risen about four feet, near the conduit inlet.

The gully below the barrier had been filled when the experimental installation was made, and had long since grassed over. Not a sign of erosion had developed below the barrier.

It is seldom appreciated that run-off water in cultivated areas carries with it a very substantial proportion of the fertilizers present on the land. These fertilizers include natural fertilizers which have been formed by electrical storms and carried into the soil by rains, and those formed by the weathering of the soil and the decay of organic material present in the soil. In addition, the farmer periodically adds fertilizers to the soil. The run-off water following a rainfall carries away a large proportion of these fertilizers, and they eventually wind up in our streams and rivers. By means of my invention, a large proportion of these fertilizers is recovered along with the silt, and retained on the land. This applies not only to insoluble fertilizers such as limestone and phosphates, but to soluble fertilizers as well. The importance of this recovery of fertilizers cannot be over-emphasized.

A modification of my methods permits the immediate recovery and usage of land newly protected by the application of my principles, where the land is potentially very valuable and it is desired that the natural healing of the now protected land be assisted and hastened.

In this modification, simultaneously with the construction of the barrier 12, the gullied land above the barrier is shaped with earth-moving equipment, eliminating the deep gullies and leaving gradually sloping surfaces. The land is then farmed or cultivated in the usual manner, since this does not interfere with the normal functioning of the dry basin means, nor affect the protection it furnishes to the land above the barrier. The gullies are normally refilled with earth from the adjacent, elevated terrain, and the earth for the barrier obtained from the area below its location; however, the controlling principle is to obtain the earth for these purposes from that area which is closest yet which will not aggravate the erosion conditions which are being corrected.

Of course, this modification of my methods represents a refinement that may not presently appear practical for waste land, but on gullied land otherwise of fair quality, the extra cost is quickly recovered through profits realized from immediate use of the land.

*Example 2*

An example of the experimental application of this modification of my methods and dry basin means, to a twenty acre tract of Illinois land, illustrates how my invention is utilized in immediately reclaiming land badly damaged by erosion. Formerly valuable farm land, this tract had been rendered almost worthless by the formation of two major and several small gullies.

One gully, three to four feet deep and ten to fifteen feed wide, extended from the southwest corner of the field to the east central edge, where it was joined by a larger gully, four to five feet deep and fifteen to twenty feet wide, extending from the northwest corner of the field. This field had long since been abandoned for cultivation, and it was even difficult to rent it as pasture at a $5.00 per acre annual fee. The sale value was estimated at about $75 per acre.

An earth barrier of the type shown in Figures 3 and 4 was erected below the junction of the gullies, the gullies filled and the land left with gradual slopes toward the low areas. This installation cost $500, or $25 per acre.

Under close and frequent inspection, this experimental field was then annually planted in corn and soybeans, earning about $60 to $120 per acre yearly, or enough to more than pay off the reclamation cost in one year. Meanwhile, no erosion has developed in this field, and the dry basin silt level has risen about two feet at the conduit. The owner recently refused to sell this field at $250 per acre.

As a part of the experiment, the gully below the barrier had not been touched, to see what would occur in that area. This gully immediately began to heal, and is now completely grassed over, showing that with the reduced flow of water from the barrier, the land is also protected and healed below my dry basin.

It should be emphasized that my invention is especially suitable in the application of erosion control fairly near the source of erosion, at the higher elevations of the terrain. While every worker in the art realizes the importance of applying the controls at this point, no one prior to my invention has developed a successful method for stopping erosion at its source. According to the principles of my methods, the water is released from the dry basin at such a slow rate that it will not cause any substantial erosion below the barrier structure. This is one of many features which distinguish my methods and means of erosion control from the prior art.

Another distinguishing feature resulting from the adoption of my methods and means of erosion control is that water discharged from the conduit 16 is quite free of silt, especially in the later stages of flow of run-off water into the dry basin 13. That is, the motion of the water has been stilled sufficiently so that practically all of the silt and sediment in the water have been deposited on the floor of the basin. For this reason, the water discharged from the conduit 16 can be used for filling a lake to be used as a source of drinking water, for for recreational or industrial purposes.

Another great advantage to be derived from the adoption of my invention is the reduction in size—or even total elimination—of culvert and bridge installations. Thus, every culvert and bridge is designed on a theory along the lines of the well-known Talbot or Manning formulas, to accommodate the total run-off water from even a very heavy rain. Their design is predicated on the assumption that this run-off water will pass through the culvert or bridge structure within a very short time following a rainfall. It is imperative that they be designed to handle the largest possible rainfall, such as a cloudburst. By the adoption of my methods of erosion and flood control, these structures can be greatly reduced in size and in many cases eliminated. It is not difficult to imagine what this could mean in savings in the construction of highways and railroads.

Thus, Talbot's formula would require the installation of a 9.5 feet diameter culvert to handle all of the run-off water from 640 acres of rolling ground where the annual rainfall of the area is about 40 inches, i. e., a culvert of that size would be required under a highway or railroad passing over the gully carrying the run-off water from such an acreage. In sharp contrast, utilizing the principles of my invention, a discharge conduit of less than one foot is adequate where using one of my dry basins. The highway or railroad could pass safely over my dry basin barrier. Adoption of my principles obviously leads to a tremendous reduction in cost of culvert and bridge construction and maintenance for such embankments.

Figure 3 illustrates the use of my dry basin principles and means with a conventional terrace, to recover the use of a large sloping land area which has been rendered useless by the formation of a series of gullies.

In Figure 3, the terrace 26 is constructed at the foot of a large, gently sloping area 27, on the "break" of the slope and above the head of the gullies crossing the sloping field 28 below, which in turn merges into the bottom land 29. This terrace 26 is laid with a slight fall toward one end, which end merges into one of my dry basin structures 12. Rainfall is carried along the terrace 26 and discharged into the dry basin 13, the terrace being protected against erosion by its gradual slope and a grass or other vegetative covering which is preferably used.

The combination of a terrace with my dry basin means makes possible the handling of the run-off water from a relatively large area. It is especially adaptable where the land slopes in several directions, as on a fairly level area at the top of a hill. By properly forming a terrace, the run-off water from these various slopes can be directed into a single dry basin, which is more economical than constructing several dry basins.

The dry basin in this combination functions in essentially the same manner as previously described. The silting takes place almost exclusively in the dry basin, although the rate of silting may be slower, because even though a greater area of land is being protected by a single basin, the slope of the land is relatively small.

*Example 3*

On one experimental trial of this combination of a terrace and a dry basin, a large field sloping principally in two directions was selected for study.

This field has become badly eroded with several small cuts leading to a small stream in adjacent bottom land. A dry basin was constructed toward one end and near the top of this field, and a terrace about 1000 feet long was made, crossing the upper ends of several gullies, and leading to the dry basin. This combination was designed to handle all the run-off water from the entire field.

After about a year, the erosion has been stopped above and below the terrace and dry basin, the dry basin has silted-in to a slight extent, and the terrace-dry basin operation has completely fulfilled the expectations of this design modification. The entire field is now more valuable as dairy farm pasturage, which is the use that was and is being made of it.

Many other uses can be made of the principles, and methods and means of my invention, and these other possible uses will undoubtedly occur to those skilled in the art. It is intended that all such variations be included within the scope of my invention and the claim thereto.

For example, my dry basin means is not limited in application to the elimination of erosion in gullies and rough terrain. It may be used advantageously on a field which apparently has very little slope, perhaps no more than about 0.3%. Thus, on such a field a long, low barrier may be constructed along, say, two sides, with a conduit being provided at the lowest point and the spillway being the areas at the extreme ends of the barrier.

In such a dry basin, the primary object would not specifially be to stop erosion, since the land may slope so little as to preclude erosion, but rather to prevent the loss of fertilizer. During times of rainfall, this dry basin field may fill with water over most of its area, but by the slow and controlled discharge of water through the conduit, the fertilizer which would otherwise be quickly carried away in normal run-off water is held on the land long enough to be largely re-deposited in the soil.

All such variations and modifications of my invention are intended to be covered in the following claim.

Having now described and illustrated my invention, I wish it to be understood that my invention is not to be limited to the specific forms or arrangements of parts herein described and shown, or specifically covered by my claim.

That which is claimed as new is:

The method of stopping erosion by slit-containing water flowing in a gully, and causing deposition of silt therefrom, comprising: erecting a water barrier across said gully to provide a temporary retaining basin for at least some of said water, said barrier comprising a conduit positioned substantially horizontally beneath and transversely of said barrier, the inlet of said conduit being at the lowest point in the basin; providing a spillway near one end of said barrier of lower elevation than the top of said barrier; receiving silt-containing water in said basin; causing water to collect in said basin by discharging water from the floor of said basin solely through said conduit at a flow volume substantially less than that at which water enters said basin, and thereby causing deposition of silt from said water on the floor of said basin, in substantially successive increments at the ever-changing water periphery; and continuously discharging desilted water from said conduit until said basin is empty; whereby erosion in said gully is eliminated and said basin is thereafter operable as a safely cultivatable dry basin, wherein the basin floor slopes upwardly from the conduit level to the ultimate silt level.

References Cited in the file of this patent

UNITED STATES PATENTS

| | | |
|---|---|---|
| 680,738 | Seuazanetti | Aug. 20, 1901 |
| 1,083,148 | Sparks | Dec. 30, 1913 |
| 1,852,983 | Scott | Apr. 5, 1932 |
| 1,878,383 | Crouse | Sept. 20, 1932 |
| 2,077,307 | Bumpas | Apr. 13, 1937 |

OTHER REFERENCES

A booklet, pages 2 to 24 entitled "Vitrified Clay Sewer Pipe and Drain Tile on the Farm," published by Texarkana Pipe Co., Texarkana. Dated Jan. 23, 1920.